United States Patent
Babol et al.

(10) Patent No.: US 11,645,245 B2
(45) Date of Patent: May 9, 2023

(54) CONTAINER SOFTWARE DISCOVERY AND CATALOGING

(71) Applicant: International Business Machines Corporation, Armonk, NY (US)

(72) Inventors: Adam Babol, Lubartow (PL); Jacek Midura, Zabierzow (PL); Jan Galda, Nowy Sacz (PL); Lukasz Tomasz Jeda, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 16/583,305

(22) Filed: Sep. 26, 2019

(65) Prior Publication Data

US 2021/0097037 A1 Apr. 1, 2021

(51) Int. Cl.
| | |
|---|---|
| *G06F 16/00* | (2019.01) |
| *G06F 16/188* | (2019.01) |
| *G06F 16/31* | (2019.01) |
| *G06F 21/62* | (2013.01) |
| *G06F 9/50* | (2006.01) |
| *G06F 8/71* | (2018.01) |
| *G06F 11/14* | (2006.01) |
| *G06F 21/53* | (2013.01) |

(52) U.S. Cl.
CPC .............. *G06F 16/192* (2019.01); *G06F 8/71* (2013.01); *G06F 9/5077* (2013.01); *G06F 11/1446* (2013.01); *G06F 16/322* (2019.01); *G06F 21/53* (2013.01); *G06F 21/6218* (2013.01); *G06F 2201/84* (2013.01)

(58) Field of Classification Search
CPC ...... G06F 21/53; G06F 9/5077; G06F 9/5061; G06F 16/9027; G06F 16/192; G06F 9/45558; G06F 8/61; G06F 11/1004; G06F 21/6218; G06F 2201/84; G06F 2009/45579; G06F 16/322; G06F 11/1446; G06F 8/71; G06F 16/188; G06F 16/31; G06F 21/62; G06F 9/50; G06F 11/14

See application file for complete search history.

(56) References Cited

U.S. PATENT DOCUMENTS

| | | |
|---|---|---|
| 10,223,074 B2 | 3/2019 | Brandys |
| 2005/0165760 A1* | 7/2005 | Seo .......................... G06F 8/71 |

(Continued)

OTHER PUBLICATIONS

Disclosed Anonymously, Method and system for run-time discovering software deployed on Linux containers with no monitoring inside containers, IP.com No. IPCOM0002442590, Nov. 26, 2015 (Year: 2015).*

(Continued)

*Primary Examiner* — Ashish Thomas
*Assistant Examiner* — Suman Rajaputra
(74) *Attorney, Agent, or Firm* — Randy Tejeda

(57) ABSTRACT

In an approach to discovering software in a container, one or more computer processors identify one or more sets of filesystem structure information for an active container. The one or more computer processors create a virtual filesystem based on the one or more identified sets of filesystem structure information. The one or more computer processors discover one or more sets of software by comparing a set of catalog entries to the created virtual filesystem. The one or more computer processors report the one or more sets of discovered software.

15 Claims, 3 Drawing Sheets

(56) References Cited

U.S. PATENT DOCUMENTS

| | | | |
|---|---|---|---|
| 2018/0137139 A1* | 5/2018 | Bangalore | G06F 16/2379 |
| 2018/0341471 A1* | 11/2018 | Stefanov | G06F 8/63 |
| 2019/0146772 A1* | 5/2019 | Griffin | G06F 8/71 |
| | | | 717/121 |
| 2019/0250835 A1* | 8/2019 | Piccinini | G06F 21/78 |

OTHER PUBLICATIONS

Disclosed Anonymously, "A Method and System for Robust and Efficient Software Discovery on the Linux Containers Environment by Incremental Scans", An Ip.com Prior Art Database Technical Disclosure, IP.com No. PCOM000244746D, IP.com Electronic Publication Date: Jan. 8, 2016, 4 pages.

Disclosed Anonymously, "Method and System for Run-Time Discovering Software Deployed on Linux Containers with no Monitoring Inside Containers", An IP.com Prior Art Database Technical Disclosure, IP.com No. PCOM000244259D, IP.com Electronic Publication Date: Nov. 26, 2015, 3 pages.

* cited by examiner ic # CONTAINER SOFTWARE DISCOVERY AND CATALOGING

BACKGROUND

The present invention relates generally to the field of operating system virtualization, and more particularly to containerization.

OS-level virtualization refers to an operating system paradigm in which a kernel allows the existence of multiple isolated user-space instances. Such instances, called containers, zones, virtual private servers, partitions, virtual environments, virtual kernel or jails, may look like real computers from the perspective of the contained software, applications, or programs. A computer program running on an ordinary operating system can see all resources (connected devices, files and folders, network shares, CPU power, quantifiable hardware capabilities) of that computer, however, programs running inside of a container can only see the contents of the container and devices assigned to the container. Operating-system-level virtualization is commonly used in virtual hosting environments, where it is useful for securely allocating finite hardware resources among a large number of independent users. System administrators may also use it for consolidating server hardware by moving services on separate hosts into containers on a single host (e.g., server). Containers are commonly used to separate containers for improved security, hardware independence, and added resource management features. Operating-system-level virtualization implementations capable of live migration can also be used for dynamic load balancing of containers between nodes in a cluster. Operating-system-level virtualization usually imposes less overhead than full virtualization because programs in virtual partitions use the normal system call interface of the operating system and do not need to be subjected to emulation or be run in an intermediate virtual machine, as is the case with full virtualization and paravirtualization. This form of virtualization also does not require hardware support for efficient performance.

Operating-system-level virtualization is not as flexible as other virtualization approaches since it cannot host a guest operating system different from the host one, or a different guest kernel. Some implementations provide file-level copy-on-write (CoW) mechanisms. Most commonly, a standard filesystem is shared between partitions, and those partitions that change the files automatically create copies. This is easier to back up, more space-efficient and simpler to cache than the block-level copy-on-write schemes common on whole-system virtualization. Whole-system virtualization, however, can work with non-native filesystems and create and roll back snapshots of the entire system state.

SUMMARY

Embodiments of the present invention disclose a computer-implemented method, a computer program product, and a system for discovering software in a container. The computer-implemented method includes one or more computer processors identifying one or more sets of filesystem structure information for an active container. The one or more computer processors create a virtual filesystem based on the one or more identified sets of filesystem structure information. The one or more computer processors discover one or more sets of software by comparing a set of catalog entries to the created virtual filesystem. The one or more computer processors report the one or more sets of discovered software.

DETAILED DESCRIPTION

Commonly, entities utilize catalog base discovery to identify software in a plurality of computational environments. Said entities utilizes catalog base discovery to compare catalog entries with filesystem elements to detect the presence of installed software. Such traditional methods of software discovery are wholly ineffective for identifying software within containerized or virtualized application stacks. Containers are dynamic and may significantly depart from the original condition (e.g., base image) of the container. Furthermore, the container environment is dynamic and subject to rapid changes and cause said containers diverge from initial creation. Typically to discover said applications, additional software needs to be installed and maintained to effectuate the search. Many container systems are read-only thus do not allow any additional software to be installed, preventing any software discovery methods from being installed and implemented. Traditionally, containerization best practices dictate that each container host only one process allowing individual processes to be initiated, paused, and stopped without any effect on other running containers, thus installing the software discovery application would violate said practices.

Embodiments of the present invention allow for the discovery and identification of software, applications, or programs on one or more active containers without the explicit modification of the container. Embodiments of the present invention allow for the identification of software, applications, and programs without the need to pause, restart, or stop an active (e.g., running) container. Some embodiments of the present invention recognize that creating a virtual filesystem mimicking the filesystem of the container, allows software discovery tools to utilize system tools available on the host to scan and identify software contained within the container. Embodiments of the present invention recognize that utilizing common system tools available on the host, reduces system impact of installing dedicated discovery software and dependencies thus reducing memory and computational requirements. Implementation of embodiments of the invention may take a variety of forms, and exemplary implementation details are discussed subsequently with reference to the Figures.

The present invention will now be described in detail with reference to the Figures.

Figure 1:
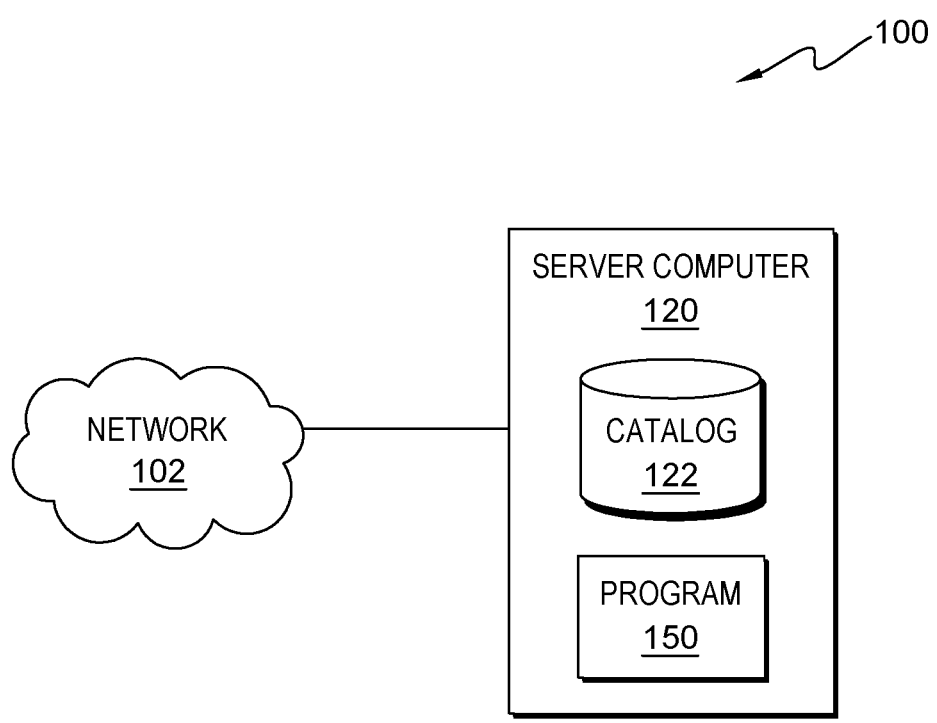
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes catalog 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 3.

Catalog 122 is a repository for data used by program 150. In the depicted embodiment, catalog 122 resides on server computer 120. In another embodiment, catalog 122 may reside elsewhere within distributed data processing environment 100 provided program 150 has access to catalog 122. A database is an organized collection of data. Catalog 122 can be implemented with any type of storage device capable of storing data and configuration files that can be accessed and utilized by program 150, such as a database server, a hard disk drive, or a flash memory. In an embodiment, catalog 122 stores data used by program 150, such as historically identified software and commonly utilized software. Catalog 122 maintains entries for each software, application, or program that program 150 encounters, scans, identifies, or retrieves. Catalog 122 stores and maintains the filesystem structure and associated metadata of the software entries contained therein. Catalog 122 associates filesystem structure information including, but not limited to, the group containing (e.g., consisting) filenames, folder names, parent folders, subfolders, associated permissions, creation dates, modified dates, symbolic links, file sizes, folder sizes, file types, hidden files, hidden folders, associated inodes and v-nodes, of each software with a respective catalog 122 entry. In an embodiment, catalog 122 maintains separate, but related, entries for different versions or revisions of the same software. In this embodiment, catalog 122 maintains only the differential between the files of the original versions and all subsequent versions.

Program 150 is a program for discovering software in an active container without modifying the container. In an example embodiment, program 150 identifies one or more sets of filesystem structure information for an active container; creates a virtual filesystem based on the one or more identified sets of filesystem structure information; discovers one or more sets of software by comparing a set of catalog entries to the created virtual filesystem; and reports the one or more sets of discovered software. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within distributed data processing environment 100. Program 150 is depicted and described in further detail with respect to FIG. 2.

The present invention may contain various accessible data sources, such as catalog 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
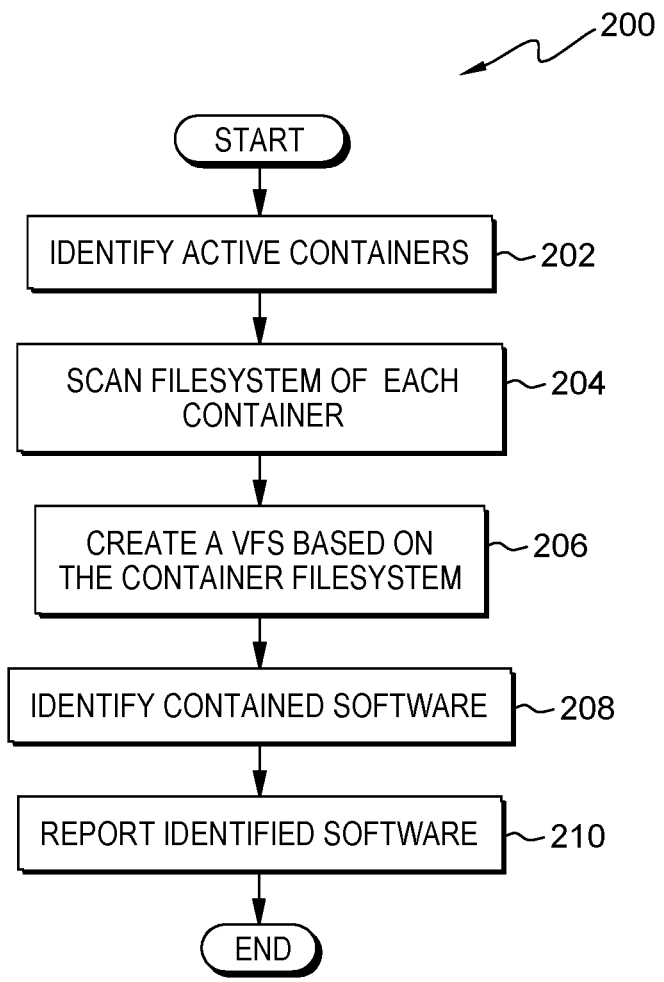
FIG. 2 is a flowchart depicting operational steps of a program, on a server computer within the data processing environment of FIG. 1, for discovering software on an active container without modifying the container, in accordance with an embodiment of the present invention.

FIG. 2 is a flowchart depicting operational steps of program 150 for discovering software in a container without modifying the container, in accordance with an embodiment of the present invention.

Program 150 identifies available containers (step 202). In various embodiments, program 150 retrieves a list of containers. In this embodiment, program 150 transmits a request (e.g., command, etc.) to a plurality of platform-as-a-service products and container management/orchestration applications, known in the art, to return or output a list of all containers and associated information such as container id, container name, status (e.g., running, paused, stopped, etc.), base image, utilized ports, container location, container health, container network, any associated labels or tags, container creation date, and related or linked containers. For example, program 150 sends a ps command to a container management daemon to output a list of all containers and program 150 may store said information in catalog 122. In various embodiments, tags can be sent in addition to the request to constrain the output. For example, program 150 requests to only receive information regarding running containers.

In various embodiments, program 150 utilizes system tools available on the host system. In an embodiment, program 150 utilizes system tools to output information regarding running host processes such as process id, process user, CPU utilization, memory utilization, up duration, starting command, process file location, etc. For example, program 150 transmits the ps command on the host to receive a list of all active processes and associated information. In another embodiment, program 150 creates a process tree utilizing the information described above. The process tree shows the relationship of all the running processes on the host in which containers can be identified. Program 150 stores all identified, retrieved, received, or discovered container information and associated metadata into catalog 122 and associated this information with an identifying hash or id.

Program 150 scans the filesystem of each container (step 204). Program 150 scans (e.g., depth-first scanning, etc.) a filesystem, identifying all subfiles and subfolders contained within the filesystem of a container and creates one or more sets of filesystem structure information such as filenames, folder names, parent folders, subfolders, associated permissions, creation dates, modified dates, symbolic links, file sizes, folder sizes, file types, hidden files, hidden folders, associated inodes and v-nodes, etc. For example, program 150 inputs or transmits the ls command, prompting the host system to output all subdirectories, subfiles, and associated information. In an embodiment, program 150 deconstructs the files into one or more sets of file contents, each containing a header (contains timestamps, file types, ownership, access control lists, reference counts, etc.) and file information blocks. In another embodiment, program 150 recursively iterates through every folder contained in or associated with a container. In this embodiment, program 150 begins at the root folder (e.g., "/") and recursively follows each subfolder down to the its "leaves" or instances where no subfolders exist. Program 150 records all the instances, including associated information and metadata, developing a map of the file structure of the container. Responsive to program 150 completing the recursive operation, program 150 stores all the recorded information into catalog 122. In an embodiment, program 150 maintains a cache that temporary stores containers and container files that can be compared to in-progress files, allowing program 150 to avoid processing filesystems stemming from previously scanned or processed containers or containers utilizing common base images.

Program 150 creates a VFS based on the filesystem of the container (step 206). Program 150 creates a virtual filesystem (VFS) based on the information determined in step 204. In an embodiment, program 150 utilizes the one or more sets of filesystem structure information to construct one or more virtual filesystems (VFSs) representing the filesystems of the active containers contained in the host. Program 150 utilizes the created VFS as an abstraction of the filesystem of the container. In an embodiment, program 150 grafts a VFS subtree onto the logical filesystem tree of a container. This mount point ties together a mounted-over v-node (virtual node) and the root of the virtual filesystem subtree. A mounted-over, or stub, v-node points to the VFS, and the mounted VFS points to the v-node that it is mounted over. Program 150 creates a v-node for every reference (e.g., file reference) made to a file by path name based on the one or more sets of filesystem structure information. In an embodiment, as program 150 creates the VFS, if the VFS already has a v-node representing the file (e.g., file contained in the container filesystem), then program 150 increments a use count in the v-node and the existing v-node is used. If program 150 does not contain a reference to a file, then a new v-node is created. Program 150 associates every path name known to the container filesystem to one or more virtual filesystem objects. In an embodiment, program 150 runs a concurrent checksum algorithm, on both the VFS and the container filesystem, to verify that the VFS is representative of the container filesystem based on the comparison of the outputs of the check algorithm.

Program 150 identifies the contained software (step 208). Program 150 identifies all the folders and files contained within the VFS, created in step 206, and compares associated file and folder information and metadata with information and metadata contained within catalog 122. In an embodiment, program 150 compares the files and filesystem structure information of one or more files or folders contained within the created VFS with entries located within catalog 122. In this embodiment, program 150 may compare any combination of the following attributes: filenames, folder names, parent folders, subfolders, associated permissions, creation dates, modified dates, symbolic links, file sizes, folder sizes, and file types, to determine if software is contained within the container (e.g., VFS based on the file structure of the container). In another embodiment, program 150 calculates a cyclic redundancy check (CRC) score for the files contained in the VFS and compares the CRC score with CRC scores associated with software entries in catalog 122. In this embodiment, program 150 generates a check value based on a polynomial division of file contents. Program 150 compares both values and, in the event the check values do not match, corrective action can be taken. The information contained within catalog 122 is labeled with the associated software or application. For example, an open source word processing application has a dependency on the file "/opt/srv/db2.sys," thus program 150 labels said file with the corresponding software. In an embodiment, program 150 will determine that software or an application exists in a container if at least one file or dependency contained in the VFS is matched with one or more software (e.g., file associated with said software) entries contained within catalog 122.

In an embodiment, program 150 may calculate a discovery score representing a confidence (e.g., percentage, etc.) that specific software, process, or application is present in the container. In this embodiment, the discovery score is calculated based on a level of similarity between the files in the VFS and a plurality of software and applications contained in catalog 122 (e.g., software repository). For example, program 150 calculates the discovery score (e.g., numerical value, percentage, rank, etc.) based on a percentage or a level of completeness (e.g., file/folder comparison, functionality analysis, dependency analysis, etc.) between a container and an indexed software entry in catalog 122. In this example, higher discovery scores represent greater confidence in identified software. In various embodiments, program 150 determines a base operating system of the container. In an additional embodiment, program 150 ignores files (e.g., system files or tools) that are determined to belong to the operating system of the container or common files dependencies that are not indicative of contained software. In an alternative embodiment, program 150 incorporates a weight that effectively neutralizes the effect of said files when calculating a discovery score. In an embodiment, if program 150 determines that a file is commonly found within a plurality of software or application, then program 150 selects the software with the highest discovery score. In an embodiment, program 150 utilizes catalog 122 to identify a version or revision of the identified software. Responsive to program 150 identifying software or one or more applications, program 150 adds or appends any new software to a maintained list of identified software for a specified container.

Program 150 reports identified software (step 210). Program 150 presents the maintained list of identified software to one or more users. In an embodiment, program 150 presents the list of identified software to one or more users through a graphical user interface (not depicted). Said graphical user interface may exist on a utilized client computing device (not depicted), allowing the user to modify the list due to errors, corrections, or changes in the container. In another embodiment, program 150 presents the list through the command line, stdout, or terminal view of the host system. In various embodiments, program 150 displays the calculated discovery score for an identified software. In another embodiment, program 150 displays all the software, subject to a threshold, that program 150 determines may exist in a container. In an embodiment, if program 150 determines that a container has more than one software or application, then program 150 may automatically separate each software or application into a plurality of containers, wherein each software or application is isolated in a respective container (e.g., one software for each container). For example, program 150 may detect that a container has running applications, one application is a database management application while the other is a caching application. In this example, program 150 creates two new containers, and adds each identified application into a distinct container. The one application per container principle confers a plurality of advantages as follows: allows horizontal container scaling, containers can be generalized and utilized for numerous unrelated projects, grants developers the ability to suspend or modify one module of a project rather than temporarily suspending the entire suite, allows patching/upgrades to be accomplished in an isolated and controlled manner, increases application security, and allows easy access to application specific logs. Program 150 maintains all the settings and preferences associated with each identified software such as utilized ports, access to storage objects, required networks, and any linked or "family" containers.

In an embodiment, program 150 utilizes the list of identified software to identify and retrieve information and solutions for one or more security vulnerabilities present in the identified software. For example, program 150 reports that a database software contained in a container that has not been patched or updated is subject to a plurality of security vulnerabilities. In an embodiment, program 150 patches the containers with respective software vulnerability patches or fixes based on the identified contained software. In this embodiment, program 150 adjust the VFS and creates an image based on the modifications (e.g., patches, hardening, etc.). In various embodiments, program 150 automatically hardens a container after the software has been identified and reported. In this embodiment, program 150 retrieves and utilizes best practices associated with the software or the type of software. For example, if program 150 identifies a webserver on a container, then program 150 may implement practices on the container that restrict the public viewing of the root folder of the webserver. In various embodiments, hardening a container includes, but is not limited to, downgrading to a non-privileged user, limiting resource usage, sandboxing critical processes, limiting volume mounts, and binding privileged ports. In another embodiment, program 150 automatically pushes the modified container or container image (e.g., modified image based on the VFS) to an image registry. In another embodiment, program 150 automatically deploys the modified container to another host or cluster of hosts.

Figure 3:
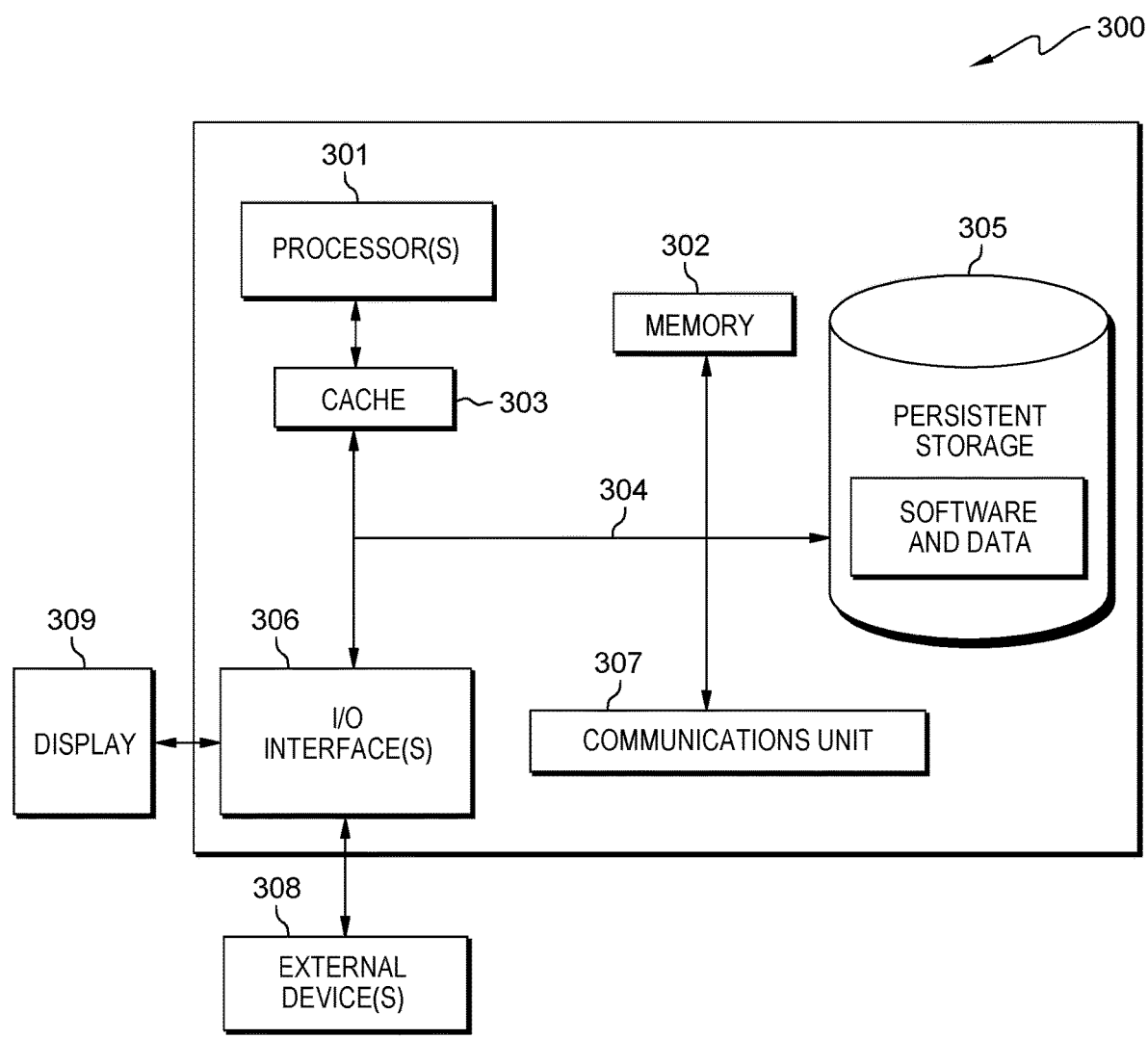
FIG. 3 is a block diagram of components of server computer, in accordance with an embodiment of the present invention.

FIG. 3 depicts a block diagram of components of server computer 120 and any other computing devices (not depicted) in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 includes communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected, respectively, server computer 120 and any other computing devices (not depicted). For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying, by one or more computer processors, one or more sets of filesystem structure information for an active container;
   creating, by one or more computer processors, a virtual filesystem based on the one or more identified sets of filesystem structure information;
   discovering, by one or more computer processors, one or more sets of software by comparing a set of catalog entries to the created virtual filesystem, comprising:
      calculating, by one or more computer processors, a discovery score for each software in the one or more sets of software based on a level of similarity between one or more files in the created virtual filesystem and a plurality of software contained in the set of catalog entries, wherein the discovery score is a measure of completeness based on file and folder comparison, functionality analysis, and dependency analysis while incorporating a weight that neutralizes an effect of one or more files belonging to an operating system or common dependencies; and
      identifying, by one or more computer processors, one or more software contained in the active container based on a respective calculated discovery score;
   reporting, by one or more computer processors, the one or more sets of discovered software on a terminal view of a host system; and
   responsive to determining that the active container has more than one identified software, separating, by one or more computer processors, the active container into a plurality of isolated containers based on a respective identified software while maintaining all settings and preferences associated with the respective identified software.

2. The method of claim 1, wherein filesystem structure information is selected from the group consisting of: filenames, folder names, parent folders, subfolders, associated permissions, creation dates, modified dates, symbolic links, file sizes, folder sizes, file types, hidden files, hidden folders, associated inodes, and v-nodes.

3. The method of claim 1, wherein creating a virtual filesystem based on the one or more sets of filesystem structure information, comprises:
   grafting, by one or more computer processors, a virtual filesystem subtree onto a logical filesystem tree of a container; and
   creating, by one or more computer processors, a v-node in the grafted virtual filesystem subtree for one or more file references in the logical filesystem tree of the container.

4. The method of claim 1, further comprising:
   identifying, by one or more computer processors, one or more vulnerabilities associated with the one or more sets of discovered software;
   hardening, by one or more computer processors, the virtual filesystems of each to harden and correct the one or more identified security vulnerabilities; and
   creating, by one or more computer process, an image based on the hardened virtual filesystem.

5. The method of claim 4, further comprising:
   pushing, by or more computer processors, automatically, the created image to an image registry.

6. The method of claim 5, further comprising;
   deploying, by one or more computer processors, automatically, the pushed image to one or more hosts.

7. A computer program product comprising:
   one or more computer readable storage media and program instructions stored on the one or more computer readable storage media, the stored program instructions comprising:
   program instructions to identify one or more sets of filesystem structure information for an active container;
   program instructions to create a virtual filesystem based on the one or more identified sets of filesystem structure information;
   program instructions to discover one or more sets of software by comparing a set of catalog entries to the created virtual filesystem, comprising:
      program instructions to calculate a discovery score for each software in the one or more sets of software based on a level of similarity between one or more files in the created virtual filesystem and a plurality of software contained in the set of catalog entries, wherein the discovery score is a measure of completeness based on file and folder comparison, functionality analysis, and dependency analysis while incorporating a weight that neutralizes an effect of one or more files belonging to an operating system or common dependencies; and program instructions to identify one or more software contained in the active container based on a respective calculated discovery score;
program instructions to report the one or more sets of discovered software on a terminal view of a host system; and
program instructions to responsive to determining that the active container has more than one identified software, separate the active container into a plurality of isolated containers based on a respective identified software while maintaining all settings and preferences associated with the respective identified software.

8. The computer program product of claim 7, wherein filesystem structure information is selected from the group consisting of: filenames, folder names, parent folders, subfolders, associated permissions, creation dates, modified dates, symbolic links, file sizes, folder sizes, file types, hidden files, hidden folders, associated inodes, and v-nodes.

9. The computer program product of claim 7, wherein the program instructions, to create a virtual filesystem based on the one or more sets of filesystem structure information the one or more computer readable storage media, comprise:
program instructions to graft a virtual filesystem subtree onto a logical filesystem tree of a container; and
program instructions to create a v-node in the grafted virtual filesystem subtree for one or more file references in the logical filesystem tree of the container.

10. The computer program product of claim 7, wherein the program instructions, stored on the one or more computer readable storage media, comprise:
program instructions to identify one or more vulnerabilities associated with the one or more sets of discovered software;
program instructions to harden the virtual filesystems of each to harden and correct the one or more identified security vulnerabilities; and
program instructions to create an image based on the hardened virtual filesystem.

11. The computer program product of claim 7, wherein the program instructions, stored on the one or more computer readable storage media, comprise:
program instructions to push, automatically, the created image to an image registry.

12. A computer system comprising:
one or more computer processors;
one or more computer readable storage media; and
program instructions stored on the computer readable storage media for execution by at least one of the one or more processors, the stored program instructions comprising:
program instructions to identify one or more sets of filesystem structure information for an active container;
program instructions to create a virtual filesystem based on the one or more identified sets of filesystem structure information;
program instructions to discover one or more sets of software by comparing a set of catalog entries to the created virtual filesystem, comprising:
program instructions to calculate a discovery score for each software in the one or more sets of software based on a level of similarity between one or more files in the created virtual filesystem and a plurality of software contained in the set of catalog entries, wherein the discovery score is a measure of completeness based on file and folder comparison, functionality analysis, and dependency analysis while incorporating a weight that neutralizes an effect of one or more files belonging to an operating system or common dependencies; and
program instructions to identify one or more software contained in the active container based on a respective calculated discovery score;
program instructions to report the one or more sets of discovered software on a terminal view of a host system; and
program instructions to responsive to determining that the active container has more than one identified software, separate the active container into a plurality of isolated containers based on a respective identified software while maintaining all settings and preferences associated with the respective identified software.

13. The computer system of claim 12, wherein filesystem structure information is selected from the group consisting of: filenames, folder names, parent folders, subfolders, associated permissions, creation dates, modified dates, symbolic links, file sizes, folder sizes, file types, hidden files, hidden folders, associated inodes, and v-nodes.

14. The computer system of claim 12, wherein the program instructions, to create a virtual filesystem based on the one or more sets of filesystem structure information the one or more computer readable storage media, comprise:
program instructions to graft a virtual filesystem subtree onto a logical filesystem tree of a container; and
program instructions to create a v-node in the grafted virtual filesystem subtree for one or more file references in the logical filesystem tree of the container.

15. The computer system of claim 12, wherein the program instructions, stored on the one or more computer readable storage media, comprise:
program instructions to identify one or more vulnerabilities associated with the one or more sets of discovered software;
program instructions to harden the virtual filesystems of each to harden and correct the one or more identified security vulnerabilities; and
program instructions to create an image based on the hardened virtual filesystem.

\* \* \* \* \*